United States Patent [19]

Ahmed et al.

[11] 4,076,335

[45] Feb. 28, 1978

[54] HYDROSTATIC BEARING METHODS AND STRUCTURES

[75] Inventors: Nazeer Ahmed, Princeton; James Kevin O'Donnell, Raritan Township, Hunterdon County, both of N.J.; Glenn Lewis Schmehl, Lilburn, Ga.

[73] Assignee: Western Electric Co., Inc., New York, N.Y.

[21] Appl. No.: 807,626

[22] Filed: Jun. 17, 1977

[51] Int. Cl.² ............... F16C 17/00; F16C 33/72
[52] U.S. Cl. ............... 308/3.5; 277/3; 308/5 R; 308/9; 308/36.3
[58] Field of Search ............... 308/9, DIG. 1, 5 R, 308/3 R, 3 A, 3.5, 4 R, 170, 122, 36.1, 36.3; 277/3, 27, 44; 91/462; 92/174

[56] References Cited

U.S. PATENT DOCUMENTS

| | | | |
|---|---|---|---|
| 2,347,663 | 5/1944 | Carnahan | 308/9 |
| 3,015,315 | 1/1962 | Strimel | 91/462 |
| 3,322,473 | 5/1967 | Lebach | 308/9 |
| 3,354,792 | 11/1967 | Fuchs | 92/174 |
| 3,442,560 | 5/1969 | De Gast | 308/5 R |
| 3,570,281 | 3/1971 | Albert | 74/5 R |
| 3,661,432 | 5/1972 | Aihara | 308/9 |
| 3,841,719 | 10/1974 | Smith | 308/5 R |
| 3,973,810 | 8/1976 | Montag | 308/9 |

OTHER PUBLICATIONS

*Journal of Applied Physics*, Apr. 1973, (vol. 44, No. 4), pp. 1611–1615, Laird C. Towle, "Shear Strength and Friction Measurements on Polyethylene under High Pressure."

*Primary Examiner*—Trygve M. Blix
*Assistant Examiner*—Douglas C. Butler
*Attorney, Agent, or Firm*—A. S. Rosen

[57] ABSTRACT

A hydrostatic bearing arrangement includes a supporting member and a supported member, with the supported member borne by a pressurized hydraulic fluid located in a space between the two members. The hydrostatic bearing arrangement includes neither any provision for recirculating the fluid nor any seals for containing the fluid, but relies, instead, upon a particular property of the fluid, i.e., a high intrinsic shear strength, in order to prevent leakage of the fluid past the outer periphery of the space between the two members.

18 Claims, 5 Drawing Figures

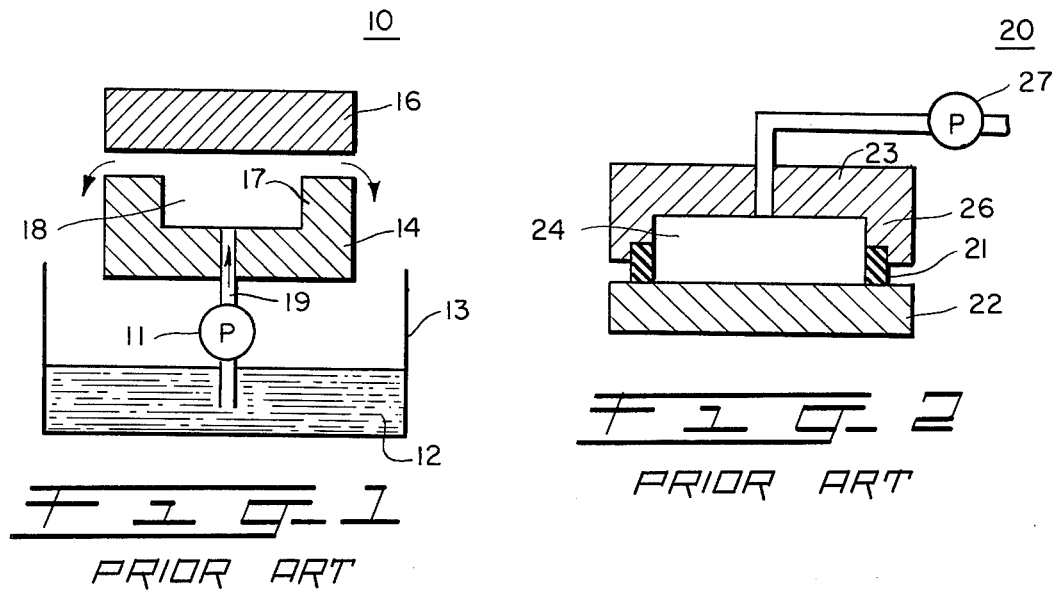
Fig. 1 PRIOR ART
Fig. 2 PRIOR ART
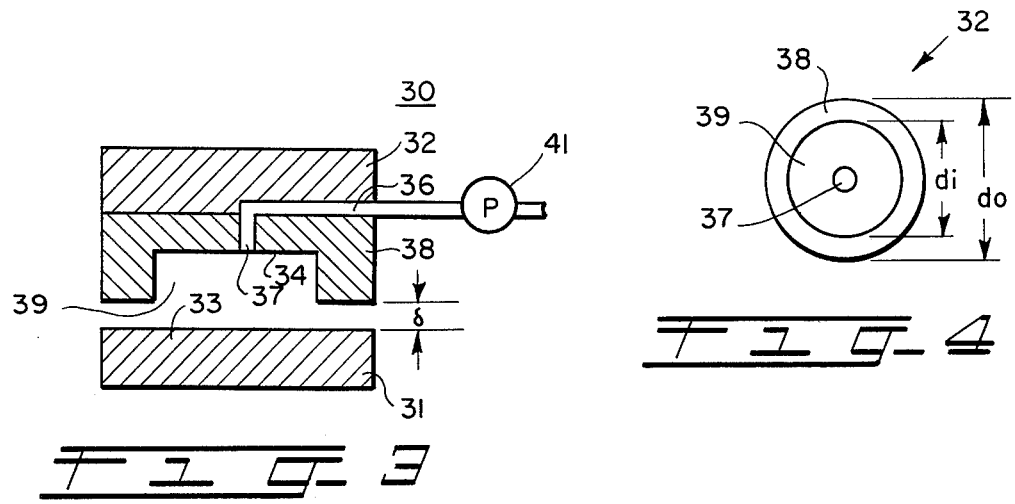
Fig. 3
Fig. 4
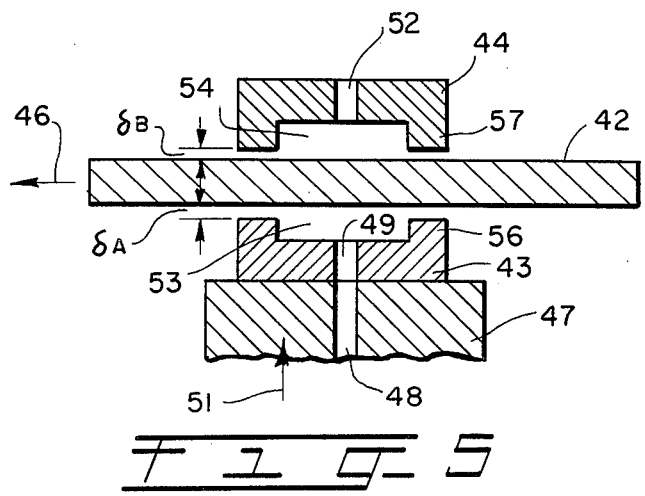
Fig. 5

HYDROSTATIC BEARING METHODS AND STRUCTURES

BACKGROUND OF THE INVENTION

1. Field of the Invention

This invention relates to methods and structures which utilize hydraulic fluids for bearing a supported surface relative to a supporting surface, with a space between such surfaces, and, more particularly, to methods and structures which utilize hydraulic fluids for bearing a supported surface relative to a supporting surface, with a space between such surfaces, without requiring either the recirculation of hydraulic fluid escaping past the periphery of the space between the surfaces, or the contact of the surfaces with seals designed to prevent such escape of the hydraulic fluid.

2. Description of the Prior Art

Hydrostatic bearings for bearing a supported surface relative to a supporting surface, with a space between the two bearing surfaces, are known. Typically, such bearings are of one or the other of two general types. A first of these general types is designed for use in a recirculating fluid system, such as will be further identified hereinafter. The other general type of known hydrostatic bearing employs one or more seals which contact both the supported surface and the supporting surface of the bearing in order to contain the hydraulic fluid.

A typical recirculating fluid system, as associated with a hydrostatic bearing, includes a pump for causing hydraulic fluid to flow through a space between two surfaces, i.e., a supporting surface and a supported surface. The pump provides sufficient pressure to the fluid for flotation of the supported surface relative to the supporting surface, such that neither surface contacts the other. The hydraulic fluid escapes past the periphery of the space between the two, non-contacting surfaces, and is collected and returned to the pump for recirculation. Recirculating fluid systems are generally considered quite adequate for relatively low pressure hydraulic bearing systems, e.g., of the order of 3,000 p.s.i. or less, but are not suitable for operation at very high pressures due to the excessive power requirement which would be involved in simultaneously recirculating a hydraulic fluid and maintaining it at a very high pressure level. Some examples of recirculating fluid systems may be found in U.S. Pat. Nos. 3,322,473 to J. L. Lebach and 3,442,560 to J. G. C. De Gast.

In the case of a hydrostatic bearing which employs one or more seals for contacting both a supported surface and a supporting surface of the bearing, such seals are utilized in order to avoid leakage of the hydraulic fluid past the periphery of the space between the two surfaces, while a pressure is maintained in the fluid by a pump in order that the supported surface may float relative to the supporting surface. A higher pressure capability is generally sought through the use of such an arrangement, the higher pressure capability, of course, permitting the bearing to handle a relatively large load using a relatively small surface area. However, surface-contacting seals are subject to wear where, as is ordinarily the case, relative movement takes place between the supported surface and the supporting surface. Such wear, of course, is greatest under relatively high load and/or relatively high surface speed conditions. An example of a hydrostatic bearing which employs seals is provided by U.S. Pat. 3,841,719 to G. R. Smith.

Efforts have previously been made to reduce leakage of hydraulic fluid past the periphery of the space between the supported and supporting surfaces of a hydrostatic bearing without the use of seals. In U.S. Pat. No. 2,347,663 to O. A. Carnahan, for example, it is indicated that fluid leakage, in hydrostatic bearing structures associated with plungers which constitute components of a fluid pump or motor, may be minimized, but not eliminated, through a judicious choice of bearing dimensions.

A technique for bearing a supported surface relative to a supporting surface without seals, and without loss of a fluid through a gap at the periphery of a space between the two surfaces, is taught in U.S. Pat. No. 3,570,281 to W. C. Albert. Such patent discloses the use of a liquid metal, such as mercury, as the bearing fluid, in supporting the gimbal of a gyroscope. The density of the suggested liquid metal, its inherently high surface tension characteristic, and its non-wettability combine to prevent its escape through the peripheral gap. While the pressures and loads which can be handled by the liquid metal bearing are not specified, it is quite clear from the nature of the liquid metal medium that only relatively small loads, with relatively low fluid pressures, are involved.

In order to handle relatively very large bearing loads, utilizing relatively small surface areas, while avoiding wear problems associated with excessive wear of seals under high load conditions, it would clearly be desirable to provide techniques and structures which afford a hydrostatic bearing the capability of operating at a relatively very high pressure in a non-recirculating hydraulic system, without resort to the use of seals, and with substantially no leakage of hydraulic fluid past the periphery of the space between the supported and supporting surfaces of the bearing.

SUMMARY OF THE INVENTION

The invention contemplates methods and apparatus for bearing a supported surface relative to a supporting surface, with a space between such surfaces, on a body of hydraulic fluid at a relatively high pressure, in such manner as to obviate the need for either the recirculation of the hydraulic fluid, with the hydraulic fluid being permitted to escape past the periphery of the space between the two surfaces, or the contact of the two surfaces with one or more seals designed to prevent such escape of the hydraulic fluid. The methods and apparatus of the invention employ an opening in one of the two surfaces for feeding the hydraulic fluid into the space therebetween, and provide a generally annular projection, substantially surrounding such opening, on a first of the two surfaces, with the projection extending into the space between the two surfaces and toward the second surface, so as to define a cavity between the two surfaces substantially enclosed by the projection and communicating with the opening. We have determined that the capabililty of supporting relatively very large loads with a seal-free, non-recirculating hydrostatic bearing arrangement may be achieved in such a structure by feeding, through the opening and into the cavity, at a predetermined pressure, a hydraulic fluid having a particular property, i.e., a high intrinsic shear strength. If the fluid selected has a sufficiently high intrinsic shear strength, substantially all leakage of the hydraulic fluid across the outer periphery of the projection will be eliminated, as the supported surface floats relative to the supporting surface, borne by the hydraulic fluid at the predetermined pressure, with the projection spaced from the second surface.

The supporting and supported surfaces may have various configurations, e.g., two adjacent, horizontal, planar, surfaces. Moreover, the opening may be in either of the two surfaces; the generally annular projection may be on either of the two surfaces; and the opening and the generally annular projection may be in or on either the same surface or different surfaces.

BRIEF DESCRIPTION OF THE DRAWINGS

FIG. 1 of the drawing is a schematic illustration, partly in section, of a typical prior art hydrostatic bearing arrangement, wherein a hydraulic fluid is recirculated continuously through the bearing;

FIG. 2 is a schematic illustration, partly in section, of another typical prior art hydrostatic bearing arrangement, wherein a seal is utilized in order to contain the hydraulic fluid within the bearing;

FIG. 3 is a schematic illustration, partly in section, of a hydrostatic bearing arrangement, constructed in accordance with the principles of the invention, wherein neither the recirculation of the hydraulic fluid nor the inclusion of any seals is required;

FIG. 4 is a schematic illustration of a supported member forming a part of the hydrostatic bearing arrangement of FIG. 3, viewed from a supporting surface on a supporting member of such hydrostatic bearing arrangement, which illustration is considered useful in describing certain examples of the bearing arrangement; and FIG. 5 is a schematic illustration, partly in section, of an alternative hydrostatic bearing arrangement, constructed in accordance with the principles of the invention, wherein a movable plate is supported relative to two supporting members.

DETAILED DESCRIPTION

Referring initially to FIG. 1 of the drawing a first known type of hydrostatic bearing arrangement 10 is illustrated schematically. The arrangement 10 is of the recirculating fluid variety wherein a pump 11 continuously circulates a hydraulic fluid 12 from a reservoir 13 through the bearing. The bearing includes a supporting member 14 and a supported member 16. The supporting member 14 has an annular projection 17 which extends toward the supported member 16 and defines a cavity 18 between the two members 14 and 16 within the annulus of the projection 17. The hydraulic fluid 12 passes from the pump 11, through a passageway 19 which opens into the cavity 18, and spills over the outer periphery of the projection 17, ending up in the reservoir 13 for recirculation through the bearing. Fluid pressure within the cavity 18 and across the projection 17 provides the necessary support for the supported member 16, which floats relative to the supporting member 14 while spaced from the supporting member 14. As has been mentioned previously, hydraulic bearing arrangements of this general type are limited in the pressures which may be employed, due to the requirement of continuous recirculation of the hydraulic fluid 12 by means of the pump 11.

Turning next to FIG. 2 of the drawing, a second known type of hydrostatic bearing arrangement 20 is illustrated schematically. The arrangement 20 is of a type which includes at least one seal 21 for contacting both a supporting member 22 and a supported member 23 so as to confine a hydraulic fluid between the two members 22 and 23, e.g., within a cavity 24 provided by an annular projection 26 on the supported member 23. A pump 27 provides sufficient pressure to the hydraulic fluid to float the supported member 23 relative to the supporting member 22, as the seal 21 remains in contact with both members 22 and 23. Hydraulic bearing arrangements of this general type are subject to leakage caused by wear on the seal 21, particularly in those instances where high loads are supported and/or high speeds of relative movement between the supporting member 22 and the supported member 23 are present.

With reference now to FIG. 3 of the drawing, another hydrostatic bearing arrangement 30 is shown schematically. The arrangement 30 is so designed as to obviate the need for either the recirculation of a hydraulic fluid, as is characteristic of the bearing arrangement 10 of FIG. 1, or the use of seals for containing the hydraulic fluid in order to prevent its escape, as is characteristic of the bearing arrangement 20 of FIG. 2.

The bearing arrangement 30 includes a supporting member 31 and a supported member 32. The supporting member 31 provides a supporting surface 33, with respect to which a supported surface 34, provided by the supported member 32, is to be borne without contact between the supporting surface 33 and the supported surface 34. A passageway 36 extends through the supported member 32 and opens into a space between the two members 31 and 32 through an opening 37 in the supported surface 34. A generally annular projection 38 on the supported member 32 extends toward the supporting member 31 while surrounding the opening 37 of the passageway 36 through the supported surface 34. The projection 38 defines a cavity 39 between the two members 31 and 32 within the confines of the projection 38. A pump 41 is employed to feed the cavity 39 with a pressurized hydraulic fluid through the passageway 36 and the opening 37 so as to support and float the supported member 32 with respect to the supporting member 31. Such support and floatation will take place without any substantial leakage of the hydraulic fluid across the outer periphery of the projection 38, even in the absence of any seals bridging the gap δ between the projection 38 and the supporting member 31, due to the nature of the hydraulic fluid which is employed, as will be described hereinafter.

The passageway 36 and the opening 37 have been illustrated and described thus far as being associated with the supported member 32 and the supported surface 34, respectively. Alternatively, the passageway 36 and the opening 37 might have been described as associated with the supporting member 31 and the supporting surface 33, it being necessary only that one of the members 31 and 32 include a passageway which opens into the cavity 39 through an opening in its respective surface 33 or 34. In similar manner, although the projection 38 has been illustrated and described thus far as being associated with the supported member 32, the projection 38 might alternatively have been illustrated and described as associated with the supporting member 31, it being necessary only that a first of the members 31 or 32 includes a projection extending from the respective surface 33 or 34 thereof toward the corresponding surface 33 or 34 of a second of the members 31 and 32, with such projection surrounding the opening in surface 33 or 34.

As shown in FIG. 3 of the drawing, the supporting surface 33 and the supported surface 34 may both be planar, and may both be oriented horizontally, with the supported surface 34 disposed above the supporting surface 33. Alternatively, the two surfaces 33 and 34 may be oriented other than horizontally and/or may be other than planar surfaces, e.g., two adjacent, concentric, cylindrical or spherical surfaces.

As shown in FIG. 4 of the drawing, the generally annular projection 38 may be circular in shape. Alternatively, the projection 38 may constitute a cavity-surrounding ridge of non-circular shape, e.g., elliptical, rectangular or triangular, preferably having rounded corners.

The nature of the hydraulic fluid employed with the hydrostatic bearing arrangement 30 of FIG. 3 will next be described. Such fluid has a particular property which is critical for use in the hydrostatic bearing arrangement 30. Specifically, the hydraulic fluid selected for such use must have a high intrinsic shear strength. Such intrinsic shear strength must be sufficient to prevent substantially all leakage of the fluid across the outer periphery of the unsealed projection 38 as the supported surface 34 floats relative to the supporting surface 33, borne by the fluid under the pressurization from the pump 41 required for such floatation, with the projection 38 spaced from the supporting surface 33 by a suitable gap, $\delta$ (FIG. 3). An intrinsic shear strength of at least 500 p.s.i. is considered preferable for operation at pressures of the order of 50,000 p.s.i. if the length of leakage path is 0.1 inch.

The intrinsic shear strength characteristics of various fluids have been determined in the past. Thus, an article in the April 1973 issue of the Journal of Applied Physics (Vol. 44, No. 4), pages 1611–1615, by Laird C. Towle, entitled, "Shear Strength and Friction Measurements on Polyethylene Under High Pressure" illustrates a method of obtaining intrinsic shear strength information for polyethylene at elevated pressures, and discloses data obtained by employing such method.

We have, in the course of our investigations concerning the use of high intrinsic shear strength hydraulic fluids for supporting bearing surfaces in non-recirculating, seal-free bearing arrangements, developed a number of different examples of advantageous fluid and bearing geometry combinations. Such examples are set forth hereafter.

EXAMPLE I

A supported bearing member 32 of the type shown schematically in FIGS. 3 and 4 of the drawing, with a fully circular projection 38 surrounding the cavity 39 and the opening 37, has been employed in supporting a load of 80 tons at a hydraulic pressure of 50,000 p.s.i., without either the recirculation of the hydraulic fluid or the use of seals. The respective inner and outer diameters, $d_i$ and $d_o$, were 2.025 inches and 2.211 inches, providing a cavity area of 3.2 square inches and a land length, i.e., the span across the annular projection 38, of 0.093 inches. The hydraulic fluid found capable of supporting the 80 ton load with the described bearing arrangement, with no substantial leakage across the outer periphery of the annular projection 38, was a synthetic hydrocarbon having a minimum viscosity, at a temperature of 60° F. and room pressure, of 180,000 centistokes, and an intrinsic shear strength of 1,000 p.s.i. at a pressure of 50,000 p.s.i., and 50 p.s.i. at room temperature and pressure. Such a synthetic hydrocarbon is commercially available from William F. Nye, Inc., of New Bedford, Massachusetts, under the trade name, Nye Fluid No. 773B.

EXAMPLE II

A supported bearing member 32 (FIGS. 3 and 4) has been used to carry a load of 4.875 tons at 50,000 p.s.i. on a cavity area of 0.195 square inches, with a land length of 0.045 inches, the respective inner and outer diameters, $d_i$ and $d_o$, being 0.500 inches and 0.590 inches. A synthetic hydrocarbon fluid with a viscosity, at a temperature at 77° F. and room pressure, of 99,000 centistokes, and an intrinsic shear strength of 1,000 p.s.i. at a pressure of 50,000 p.s.i., and 40 p.s.i. at room temperature and pressure, e.g., a fluid sold by William F. Nye, Inc. of New Bedford, Massachusetts, under the trade name Nye Fluid No. 767A, has been found suitable to support the 4.875 ton load with the described non-recirculating, seal-free bearing arrangement, without any substantial leakage of such fluid across the outer periphery of the annular projection 38.

EXAMPLE III

An opposed bearing scheme, such as is illustrated in FIG. 5 of the drawing, has been employed to support a plate 42 between two opposed supporting members 43 and 44, as the plate 42 was advanced laterally relative to the supporting members 43 and 44, i.e., in a plane parallel to the supporting members 43 and 44, in the direction of arrow 46, at a velocity of 25 feet per minute. Substantially no fluid leakage was experienced in spite of the relative movement of the parts. The supporting member 43 was carried on a movable member 47 having a suitable passageway 48 aligned with a passageway 49 through the supporting member 43. The member 47 was initially moved toward the plate 42, in the direction of arrow 51, as the hydraulic fluid was introduced through passageways 49 and 52 into respective cavities 53 and 54 within respective annular projections 56 and 57 associated with the supporting members 42 and 43. Such initial movement of the member 47 toward the plate 42 so adjusted the relative positions of the two supporting members 43 and 44 and the plate 42 that maximum clearances or gaps $\delta_A$ and $\delta_B$, for a condition of substantially no leakage of the hydraulic fluid, were established between such members and plate. Each of the supporting members 43 or 44 had an inner diameter of 0.861 inch and an outer diameter of 1.049 inch, providing a cavity area of 0.582 square inches and a land length of 0.94 inch. Various hydraulic fluids were employed, which fluid were maintained at an operating pressure of 20,000 p.s.i., including the fluids used in Examples I and II, as discussed previously. The technique of this Example III is considered particularly well suited for selecting appropriate hydraulic fluids for use in performing the techniques of our invention. It should be clear that the linear movement of the plate 42 in the direction of the arrow 46 in this Example III might be replaced or supplemented by rotary movement of the plate 42 in other examples or embodiments of our invention.

It is to be understood that the described methods, structures and examples are simply illustrative of preferred embodiments of our invention. Many modifications may, of course, be made in accordance with the principles of the invention.

What is claimed is:

1. A method of bearing a supported surface relative to a supporting surface, with a space between said surfaces, one of said surfaces including an opening for feeding a hydraulic fluid into said space, which method comprises the steps of:

a. providing a generally annular projection, substantially surrounding said opening, on a first of said surfaces, the projection extending into said space and toward the second of said surfaces, so as to define a cavity between the two surfaces substantially enclosed by the projection and communicating with the opening; and b. feeding through the opening and into the cavity, at a predetermined pressure, a hydraulic fluid having an intrinsic shear strength sufficient to prevent substantially all leakage of the hydraulic fluid across the outer periphery of the projection without the aid of any additional seals for containing the hydraulic fluid in the vicinity of the projection as said supported surface floats relative to said supporting surface, borne by the hydraulic fluid at said predetermined pressure, with the projection spaced from said second surface.

2. A method as set forth in claim 1, wherein step (b) further comprises:

c. feeding through the opening and into the cavity, a hydraulic fluid having an intrinsic shear strength of at least 500 p.s.i. at a pressure of 50,000 p.s.i.

3. A method of bearing a generally horizontal, supported surface above a generally horizontal, supporting surface, with a space between said surfaces, one of said surfaces including an opening for feeding a hydraulic fluid into said space, which method comprises the steps of:

a. providing a generally annular projection, substantially surrounding said opening, on a first of said surfaces, the projection extending into said space and toward the second of said surfaces, so as to define a cavity between the two surfaces substantially enclosed by the projection and communicating with the opening; and b. feeding through the opening and into the cavity, at a predetermined pressure, a hydraulic fluid having an intrinsic shear strength sufficient to prevent substantially all leakage of the hydraulic fluid across the outer periphery of the projection without the aid of any additional seals for containing the hydraulic fluid in the vicinity of the projection as said supported surface floats above said supporting surface, borne by the hydraulic fluid at said predetermined pressure, with the projection spaced from said second surface.

4. A method as set forth in claim 3, wherein step (b) further comprises:

c. feeding through the opening and into the cavity, a hydraulic fluid having an intrinsic shear strength at least 500 p.s.i. at a pressure of 50,000 p.s.i.

5. A hydrostatic bearing structure for bearing a supported surface relative to a supporting surface, which hydrostatic bearing comprises:

a supported member providing said supported surface;

a supporting member providing said supporting surface;

one of said members including a passageway extending therein and opening at said provided surface thereof toward said provided surface on the other member;

a first of said members including, along said provided surface thereof, a generally annular projection extending into said space and toward said provided surface on the second of said members, the projection being so located as substantially to surround the opening of said passageway in said one member in order to define a cavity between said surfaces substantially enclosed by the projection and communicating with the opening; and a source of a hydraulic fluid at a predetermined pressure connected to said passageway in said one member, said hydraulic fluid having an intrinsic shear strength sufficient to prevent substantially all leakage of the hydraulic fluid across the outer periphery of the projection without the aid of any additional seals for containing the hydraulic fluid in the vicinity of the projection as said supported surface floats relative to said supporting surface, borne by the hydraulic fluid at said predetermined pressure, with the projection spaced from said provided surface of said second member.

6. A hydrostatic bearing as set forth in claim 5, said source further comprising a source of hydraulic fluid having an intrinsic shear strength of at least 500 p.s.i. at a pressure of 50,000 p.s.i.

7. A hydrostatic bearing as set forth in claim 5, wherein said generally annular projection is of circular shape.

8. A hydrostatic bearing as set forth in claim 5, wherein said supported and supporting surfaces comprise two adjacent, horizontal, planar surfaces.

9. A hydrostatic bearing as set forth in claim 5, wherein said one member is said supported member.

10. A hydrostatic bearing as set forth in claim 5, wherein said first member is said supported member.

11. A hydrostatic bearing as set forth in claim 5, wherein said one member and said first member constitute the same member.

12. A hydrostatic bearing as set forth in claim 11, wherein said same member is said supported member.

13. A hydrostatic bearing as set forth in claim 11, wherein said same member is said supporting member.

14. A hydrostatic bearing as set forth in claim 5, further comprising:

a second supporting member positioned at an opposite side of said supported member from the first-mentioned supporting member, with one of said second supporting member and said supported member including a second passageway for communicating said hydraulic fluid from said source into a second space between said second supporting member and said supported member, and with a first of said second supporting member and said supported member including a second, cavity-defining, generally annular projection extending into said second space, such that said two supporting members serve to confine said supported member therebetween, borne by the hydraulic fluid at said predetermined pressure, with both said generally annular projections spaced from said supported member.

15. A hydraulic bearing as set forth in claim 14, further comprising:

means mounting said two supporting members for relative movement toward one another about said supported member.

16. A hydrostatic bearing as set forth in claim 14, wherein:

each of said supporting members includes a different one of said two passageways;

each of said supporting members includes a different one of said two generally annular projections; and said supported member is movable relative to said two supporting members in a plane parallel to said supporting surface.

17. A hydrostatic bearing as set forth in claim 16, wherein said supported member is a substantially flat plate which is movable linearly relative to said two supporting members in said parallel plane.

18. A hydrostatic bearing as set forth in claim 16, wherein said two generally outer projections are both of circular shape and have like dimensions.

* * * * *